United States Patent [19]
Sato et al.

[11] Patent Number: 5,400,266
[45] Date of Patent: Mar. 21, 1995

[54] ERROR PERFORMANCE MONITORING SYSTEM FOR DIGITAL EXCHANGE CIRCUIT

[75] Inventors: Naoshi Sato; Kazumi Hata, both of Saitama; Hideyo Murakami, Tokyo, all of Japan

[73] Assignee: Nippon Telegraph and Telephone Corporation, Tokyo, Japan

[21] Appl. No.: 38,688

[22] Filed: Mar. 29, 1993

[30] Foreign Application Priority Data

Mar. 31, 1992 [JP] Japan ................... 4-103945

[51] Int. Cl.⁶ ............................. G06F 15/20
[52] U.S. Cl. ................... 364/550; 371/16.5; 371/29.1; 395/575
[58] Field of Search ............. 364/550; 371/16.5, 29.1; 395/575

[56] References Cited

U.S. PATENT DOCUMENTS

| | | | |
|---|---|---|---|
| Re. 30,037 | 6/1979 | Bass | 371/29.1 X |
| Re. 31,407 | 10/1983 | Furtman et al. | 395/575 |
| 3,795,916 | 3/1974 | Wallace et al. | 371/16.5 |
| 4,912,552 | 3/1990 | Allison, III et al. | 358/84 |
| 5,012,465 | 4/1991 | Helou et al. | 370/58.1 |
| 5,047,977 | 9/1991 | Hill et al. | 371/16.5 X |
| 5,299,207 | 3/1994 | Fujii | 395/575 X |

OTHER PUBLICATIONS

"In-service Monitoring Methodology for Error Performance", Sato et al, NTT R & D, No. 10, vol. 40, 1991, pp. 1335–1340.

*Primary Examiner*—Edward R. Cosimano
*Attorney, Agent, or Firm*—Nikaido, Marmelstein, Murray & Oram

[57] ABSTRACT

A method for monitoring an error performance of each call in a digital exchange circuit has a plurality of subscriber terminals. The overall transmission system includes a plurality of circuits forming transit paths connecting the exchange circuit with each of the subscriber terminals. The method includes the steps of collecting and storing error check information of each transit path together with collected time of the information, and collecting and storing call information of each call. The call information includes call identification with terminal numbers of an originating subscriber terminal and a terminating terminal, transmission rate, start time and end time of a call, and the circuits through which the call is routed. A circuit accommodation database information is provided, which indicates which of the plurality of circuits form a path for each call. Error performance of each call is calculated according to the error check information, the call information, and the circuit accommodation database information.

6 Claims, 8 Drawing Sheets

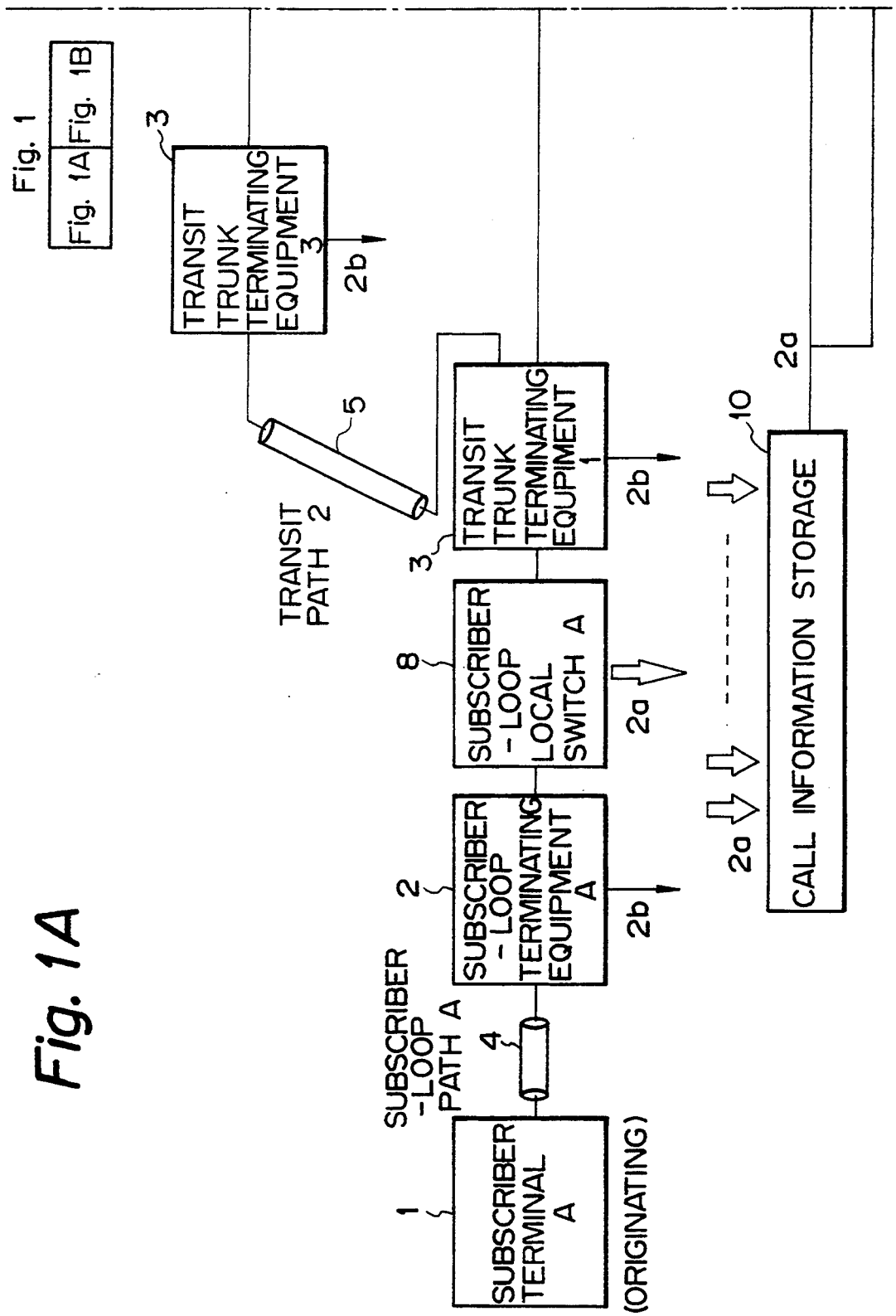

Fig. 5

| NO. OF CALL i | IDENTIFICATION OF ORIGINATING SUBSCRIBER TERMINAL D1,i | TERMINATING SUBSCRIBER TERMINAL D2,i | TRANSMISSION RATE Bc,i (Kb/s) | COMMUNICATION START TIME Xi(sec) | COMMUICATION END TIME Yi(sec) | TOTAL NUMBER OF CIRCUITS | ROUTING CIRCUIT Qi,k (k=1,2 ---- Mi) |
|---|---|---|---|---|---|---|---|
| 1 | $D_{1,1}$ | $D_{2,1}$ | $B_{c,1}$ | $X_1$ | $Y_1$ | $M_1$ | $Q_{1,1}, Q_{1,2} --- Q_{1,M1}$ |
| 2 | $D_{1,2}$ | $D_{2,2}$ | $B_{c,2}$ | $X_2$ | $Y_2$ | $M_2$ | $Q_{2,2}, Q_{2,2} --- Q_{2,M2}$ |
| 3 | $D_{1,3}$ | $D_{2,3}$ | $B_{c,3}$ | $X_3$ | $Y_3$ | $M_3$ | $Q_{3,3}, Q_{3,3} --- Q_{3,M3}$ |
| --- | --- | --- | --- | --- | --- | --- | --- |
| i | $D_{1,1}$ | $D_{2,1}$ | $B_{c,1}$ | $X_1$ | $Y_1$ | $M_1$ | $Q_{1,1}, Q_{1,2} --- Q_{1,M1}$ |

Fig. 6

| NO. OF PATH j | PATH NAME Ej | TRANSMISSION RATE Bp,j (Kb/s) | TOTAL NUMBER OF ACCOMMODATED CIRCUITS Aj | ACCOMMODATED CIRCUIT (m = 1, 2, ... Aj) |
|---|---|---|---|---|
| 1 | E1 | Bp,1 | A1 | $F_{1,1}, F_{1,2}, \text{------}, F_{1,A1}$ |
| 2 | E2 | Bp,2 | A2 | $F_{2,1}, F_{2,2}, \text{------}, F_{2,A2}$ |
| 3 | E3 | Bp,3 | A3 | $F_{3,1}, F_{3,2}, \text{------}, F_{3,A3}$ |
| ... | ... | ... | ... | ... |
| J | EJ | Bp,J | AJ | $F_{J,1}, F_{J,2}, \text{------}, F_{J,AJ}$ |

Fig. 7

| NO. OF ERROR CHECK INFORMATION g | PATH Rg | TIME Zg(sec) | NO. OF ERROR CHECK BLOCK Ng/sec | NO. OF ERRORED BLOCKS IN A SECOND ng(ng1,2,------,ng) |
|---|---|---|---|---|
| 1 | R1 | Z1 | N1 | n1 |
| 2 | R2 | Z2 | N2 | n2 |
| 3 | R3 | Z3 | N3 | n3 |
| -------- | -------- | -------- | -------- | -------- |
| G | RG | ZG | NG | nG |

ERROR PERFORMANCE MONITORING SYSTEM FOR DIGITAL EXCHANGE CIRCUIT

BACKGROUND OF THE INVENTION

The present invention relates to an error performance monitoring system of each call in digital exchange service.

A prior such system is shown in FIG. 2, in which the numeral 1 is a subscriber terminal, 2 is a subscriber-loop terminating equipment, 3 is a transit trunk terminating equipment, 4 is a subscriber-loop path, 5 is a transit trunk path, 6 is a transmission error check information storage, and 7 is an end-to-end transmission error performance evaluation equipment. The communication is carried out between the originating subscriber terminal A (subscriber terminal 1), and the terminating terminal B, through the subscriber-loop paths A and B, the subscriber-loop terminating equipments A and B, the transit trunk terminating equipments A and B, and the transit trunk path 5. A subscriber-loop terminating equipment 2 and a transit trunk terminating equipment 3 measure an error $2b$ on a path by checking a conventional parity error code. The transmission error check information storage 6 collects error check results, and stores the number of errored blocks in a predetermined duration in each transmission equipment together with the time of error occurrence. The content of the transmission error check information storage 6 is transferred to the end-to-end transmission error performance evaluation equipment 7 in every predetermined period. Then, the evaluation equipment 7 estimates the errored seconds (%ES) of the circuit between the subscriber terminals A and B. The errored second (%ES) is defined as the ratio of the errored seconds to the whole communication time.

However, the prior art of FIG. 2 has the disadvantage in that it is applicable to only a leased circuit, which has fixed paths between subscriber terminals, but it is not applicable to an exchange circuit, in which the combination of the paths between subscribers depends upon each call. Further, in case of ISDN (Integrated Services Digital Network) service, which has different routes or paths between subscribers for each call, it is impossible to measure error performance in a conventional system which has been developed for a leased circuit.

SUMMARY OF THE INVENTION

It is an object, therefore, of the present invention to overcome the disadvantages and limitations of a prior error performance monitoring system by providing a new and improved error performance monitoring system.

It is also an object of the present invention to provide an error performance monitoring system which measures not only a leased circuit but also an exchange circuit.

The above and other objects are attained by a method for monitoring an error performance of each call in a digital exchange circuit having at least a plurality of subscriber terminals, an exchange system coupled with said subscriber terminals, and transmission system which includes a plurality of transit paths, comprising the steps of; collecting and storing error performance information of each path together with collected time of said information; collecting and storing call information of each call including call identification with terminal numbers of an originating subscriber terminal and a terminating terminal, transmission rate, start time and end time of a call, and paths which said call is routed; providing a circuit accommodation database information providing a path in which a circuit of each call is routed; calculating error performance of each call according to said error check information, said call information, and said circuit accommodation database information.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is a legend identifying the proper relationship of FIGS. 1A and 1B; FIGS. 1A and 1B are a block diagram of an error performance monitoring system of a digital exchange circuit according to the present invention, FIG. 5 shows an example of call information, FIG. 6 shows an example of circuit accommodation database, and FIG. 7 is an example of error check information.

DESCRIPTION OF THE PREFERRED EMBODIMENTS

The embodiments of the invention are now described in accordance with FIGS. 1A and 1B, and FIGS. 3 through 7.

First, a circuit and a path are clearly defined in the present invention.

A path is defined as a physical or actual communication line, which is terminated by a terminal equipment.

A circuit is defined as a logical channel in each of paths which transmits a call from an originating subscriber terminal to a terminating subscriber terminal. The combination of paths for providing a specific end-to-end connection of the circuit is determined by an exchange system, and depends upon each call.

It is supposed that a path of transmission rate B2 kb/sec is used for a part of a digital circuit of transmission rate B1 kb/sec. The probability P that the circuit has the errored seconds ES by errors in said path is calculated by the following equation.

$$P = 1 - (1 - B1/B2)^{(n \times B2 \times 1000)/N} \quad (1)$$

where N is number of error check blocks of a path in a second, n is number of errored blocks in N times of checks, The error check is carried out through a parity check, or CRC check et al. When the transmission rate of a path is 1.5 Mb/sec—150 Mb/sec, the number N is preferably selected to be 330–8000.

The probability P is measured for all the circuits during the whole communication time T.

The time ratio %ES of the errored seconds ES of a circuit between an originating subscriber terminal and a terminating subscriber terminal is calculated by the following equation by using said probability P.

$$\% ES = \left( \sum_{i=1}^{T} \left( 1 - \prod_{j=1}^{M} (1 - P_{i,j}) \right) / T \right) \times 100 \quad (2)$$

where M is total number of paths in a circuits, $P_{i,j}$ is P of the circuit accommodated in a path j at time i, T is communication time duration.

Figure 1B:
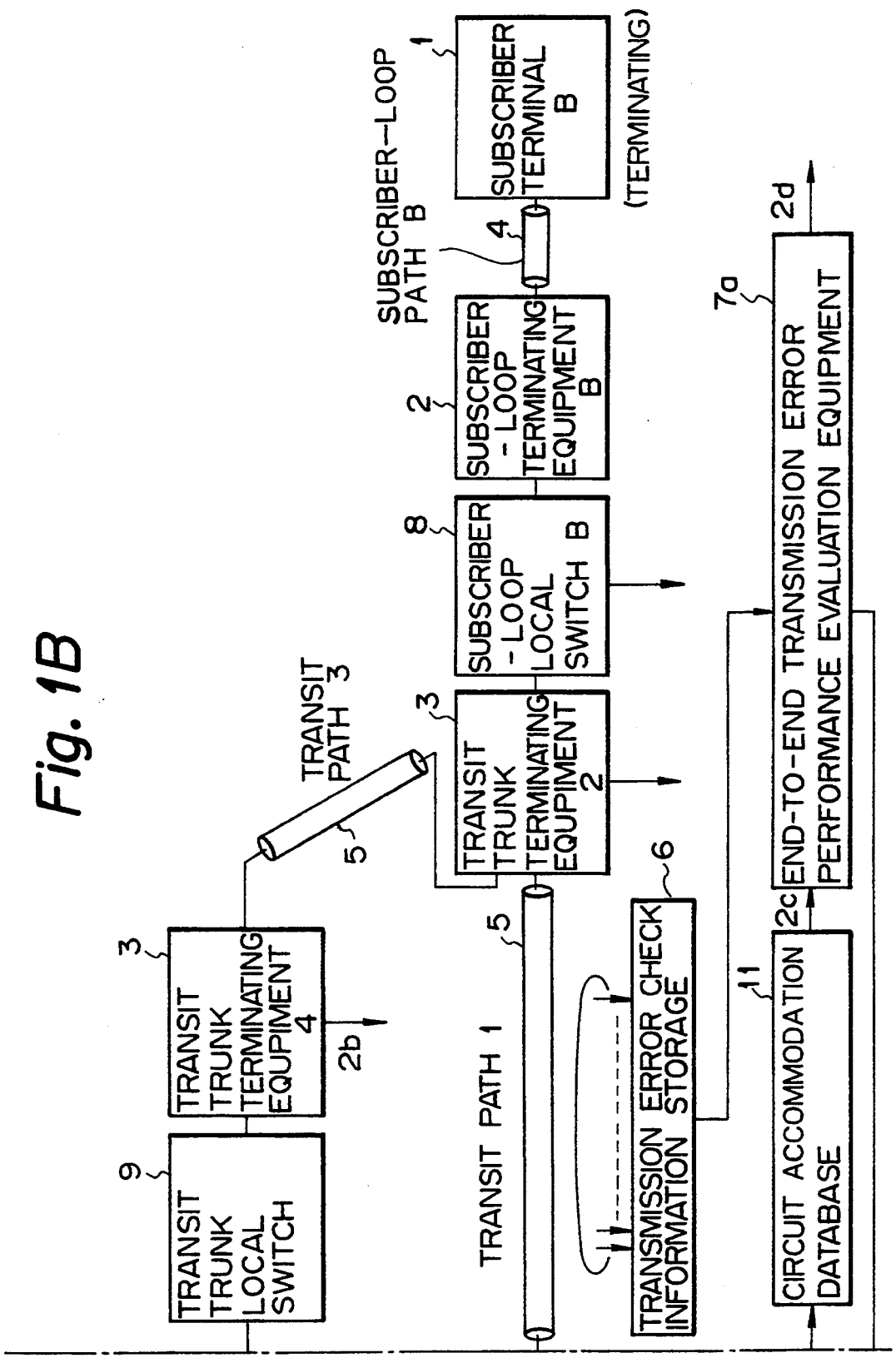
Figure 2:
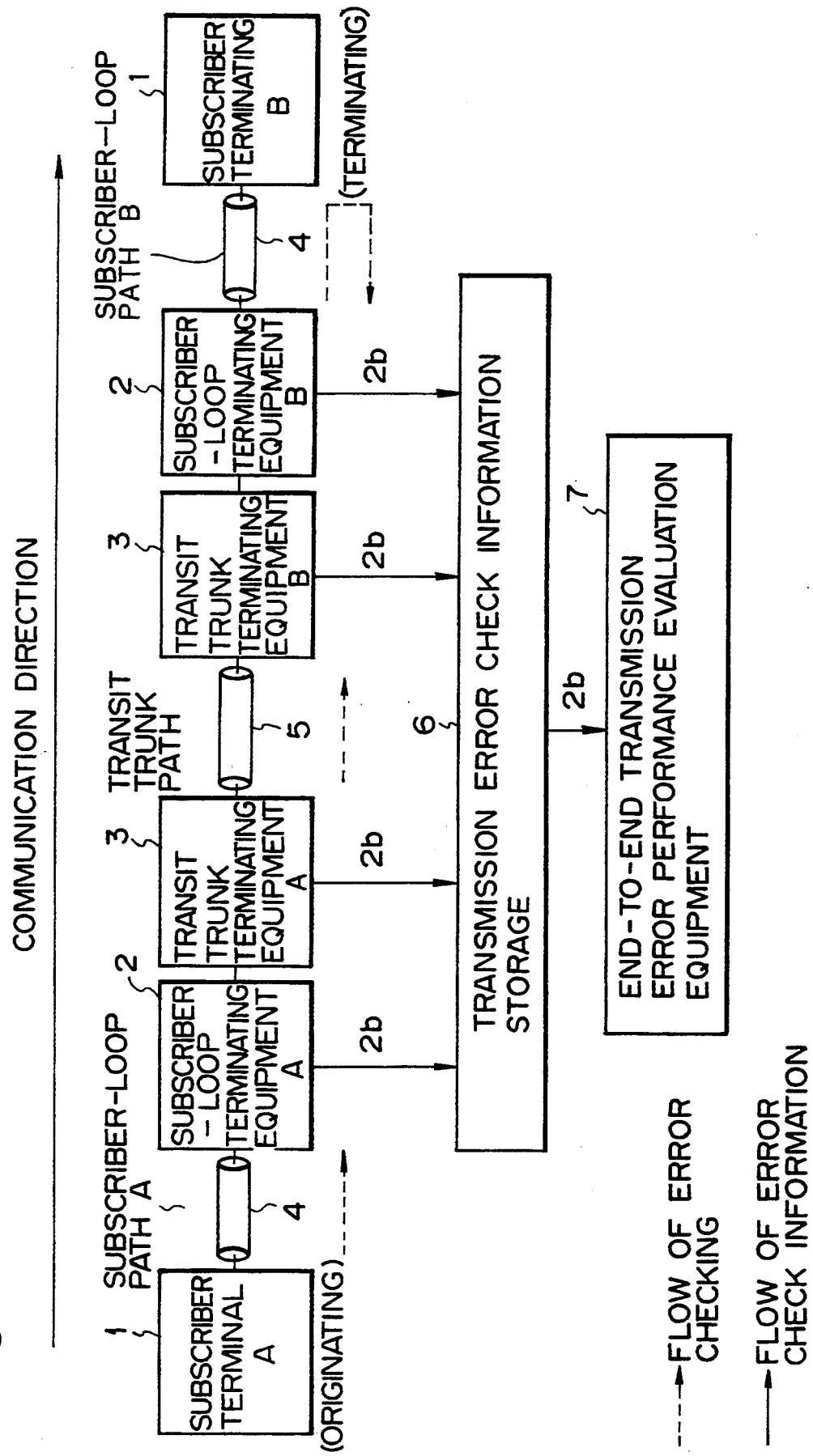
FIG. 2 is a block diagram of an error performance monitoring system of a leased circuit of a prior art.

In FIGS. 1A and 1B, a call originated by the subscriber terminal A is connected to the subscriber terminal B, through the subscriber-loop path A (4), the subscriber-loop terminating equipment A (2), the local switch A (8), the transit trunk terminating equipment 1 (3), the transit path 1 (5) (or the transit paths 2 and 3), the transit trunk terminating equipment 2 (3), the local switch B (8), the subscriber-loop terminating equipment B (2), and the subscriber-loop path B (4). The transit path 1, 2 or 3 may have a transit trunk terminating equipment 3 or 4 (4), and/or a transit trunk switch (9).

A call information storage 10 is coupled with a local switch (8), so that a call information 2a is collected for each call from the local switch (8). The call information includes an identification of an originating subscriber terminal, an identification of a terminating subscriber terminal, a transmission rate, communication start time, communication end time, and list of circuits that a call is routed. The collected information is transferred in every predetermined period to a circuit accommodation database 11 and an end-to-end transmission error performance evaluation equipment 7a.

In this regard, it is supposed that a local switch in an originating side has the information of an identification of an originating subscriber terminal, an identification of a terminating subscriber terminal, transmission rate of a call, communication start time and communication end time of a call. Also, it is supposed that a local switch in a terminating side forwards a local switch in an originating side circuits that the call is routed, in a response signal in a common signaling system. A conventional digital local switch has the above facility. Therefore, a call information required in the present invention is collected with no problem.

FIG. 5 shows an example of a call information table, which stores I number of call informations, each of which has number (i) of a call, identification $D_{1,i}$ of an originating subscriber terminal, identification $D_{2,i}$ of a terminating subscriber terminal, transmission rate $B_{c,i}$ (kb/sec), communication start time $X_i$ (second), communication end time $Y_i$ (second), total number $M_i$ of circuits that a call is routed, and list of circuits $Q_{i,k}$ (k=1, 2, 3 . . . , $M_i$) that a call is routed.

The list of circuits $Q_{i,k}$ means that the call i is connected between an originating terminal $D_{1,i}$ and a terminating terminal $D_{2,i}$, through circuits $Q_{i,1}$, $Q_{i,2}$, $Q_{i,3}$ . . . , $Q_{i,Mi}$.

The circuit accommodation database 11 stores the circuits involved in the paths, so that a circuit is retrieved from a path, and a path is retrieved from a circuit.

FIG. 6 shows an example of contents of the database 11. The example of FIG. 6 shows a table of J number of paths. In FIG. 6, each path has the information of number of path (1 through J), name of the path ($E_j$), the transmission rate $B_{p,j}$ (Kb/sec) of the path, the total circuits ($F_{j,m}$) (m=1, 2, . . . $A_j$) number of accommodated circuits $A_j$ included in the path, and the list of the circuits ($F_{j,m}$) (m=1, 2, . . . , $A_j$) included in the path.

The circuit accommodation database 11 is coupled with the call information storage 10 and the end-to-end transmission error performance evaluation equipment 7a, so that the path information 2c is applied to the end-to-end transmission error performance evaluation equipment 7a upon receipt of the call information 2a from the call information storage 10.

The transmission error check information storage 6 is coupled with each paths and the end-to-end transmission error performance evaluation equipment 7a so that the error check information 2b in each path tested is applied to the end-to-end transmission error performance evaluation equipment 7a.

FIG. 7 shows an example of the content of the transmission error check information storage 6, which stores in the example G number of test data. Each test data includes the number of error check information g (g=1 through G), the name of the path $R_g$, the time $Z_g$ (seconds) that the test is carried out, the number of error check blocks $N_g$/second which is the number of tests in a second, and the number of errored blocks in a second $n_g$ ($n_g$=1, 2, . . . $n_g$).

The time $Z_g$ is represented by second which starts at a predetermined reference time. The number of error check block $N_g$ is preferably in the range 330 and 8000 depending upon the transmission rate of the path. The number $n_g$ of errored blocks is the ratio of errored blocks to the tested blocks $N_g$.

The operation of the present error rate monitoring system has two phases. The first phase is to list the path information of the circuit, and the second phase is to calculate the error performance in the circuit according to said path information.

Figure 3:
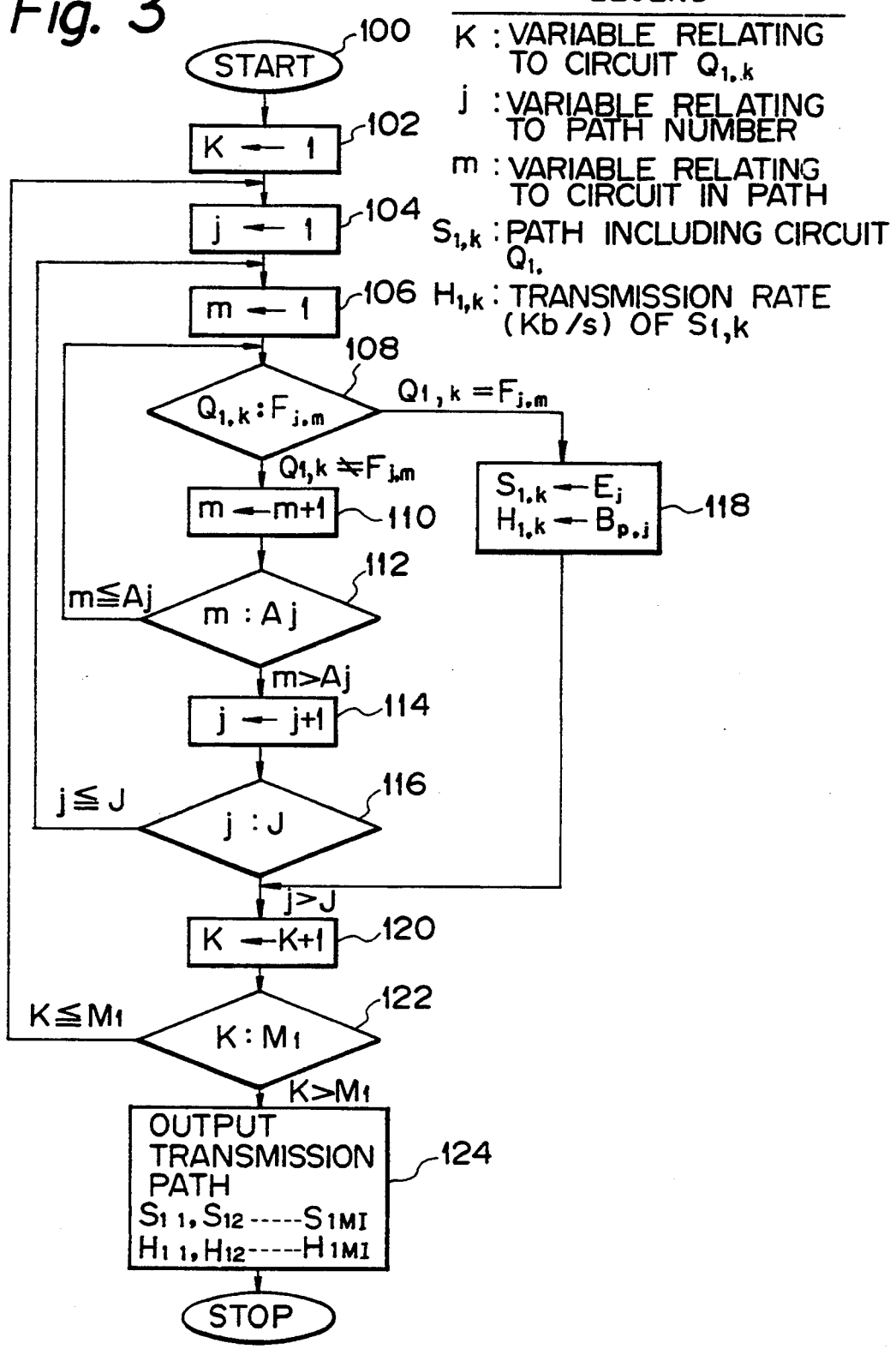
FIG. 3 is an operational flow chart for providing a path information by searching a circuit accommodation database to find a set of routed paths for an exchanged circuits for each call.

FIG. 3 shows a flow-chart of the operation of the first phase which provides the path information (name $S_{I,k}$ of the path and the transmission rate $H_{I,k}$ of the path) constituting the circuit for the call I in FIG. 5 in a programmed computer.

The call information in FIG. 5 provides the list of the routing circuits $Q_{I,k}$ of the call I. That call information 2a is applied to the circuit accommodation database 11 which provides the path information 2c. The operation for retrieving the path information for the routing path $Q_{I,k}$ of the call I is now described in accordance with FIG. 3.

In FIG. 3, the box 100 shows the start of the operation. The boxes 102, 104, and 106 show the initialization of the variables k, j and m, to 1, where k is a variable relating to a circuit $Q_{I,k}$, j is a variable relating to path number, and m is a variable relating to a circuit in the path.

The box 108 compares the routing circuit $Q_{I,k}$ in the call information with the circuit $F_{j,m}$ in the database of FIG. 6. If the former coincides with the latter, the operation goes to the box 118, where the path $E_j$ (FIG. 6) and the transmission rate $B_{p,j}$ (FIG. 6) are inserted to $S_{I,k}$ and $H_{I,k}$, respectively. If they do not coincide with each other, the value m is incremented by one until it reaches $A_j$ (boxes 110 and 112), and the comparison in the box 108 is repeated. When the value m exceeds the value $A_j$, then, the value j is incremented by one (114) until it reaches j(116), and the operation in the box 108 is repeated after the value m is initialized again to one.

The above operation in the boxes 106 through 118 means that the routing circuit $Q_{I,k}$ is compared first with the circuit $F_{l,m}$ (FIG. 6) (m=1 through $A_j$) in the first path 1. When no circuit $F_{l,m}$ coincides with the routing circuit $Q_{I,k}$, then, the routing circuit $Q_{I,k}$ is compared with the circuit $F_{2,m}$ in the second path 2. The operation is repeated for all the circuits $F_{j,m}$ of all the paths (j=1 to j). When the routing circuit $Q_{I,k}$ coincides with the circuit $F_{j,m}$ in the box 108, the path name $S_{I,k}$ and the transmission rate $H_{I,k}$ are determined in the box 118. When the value j exceeds the value J (116), then the operation proceeds to box 120.

Next, the second routing path $Q_{I,2}$ is processed in the similar manner by incrementing the value k until k reaches $M_i$ (boxes 120, 122). Each time the value k is incremented, the value j is initialized to one (box 104). When it is recognized that the value K exceeds the value $M_1$ (122), the operation proceeds to box 124.

Finally, the set of the path name and the transmission rate $(S_{I,1}, H_{I,1}), (S_{I,2}, H_{I,2}), \ldots, (S_{I,Mi}, H_{I,Mi})$ are obtained (box 124). Those outputs (2c) are applied to the end-to-end transmission error performance evaluation equipment 7a.

The end-to-end transmission error performance evaluation equipment 7a estimates %ES for each call by using the call information 2a, the error check information 2b, and the path information 2c, and provides the error monitoring information 2d which includes an originating terminal identification $D_{1,i}$, a terminating terminal identification $D_{2,i}$, transmission rate $B_{c,i}$, start time $X_i$, end time $Y_i$, and percent errored second %ED.

Figure 4:
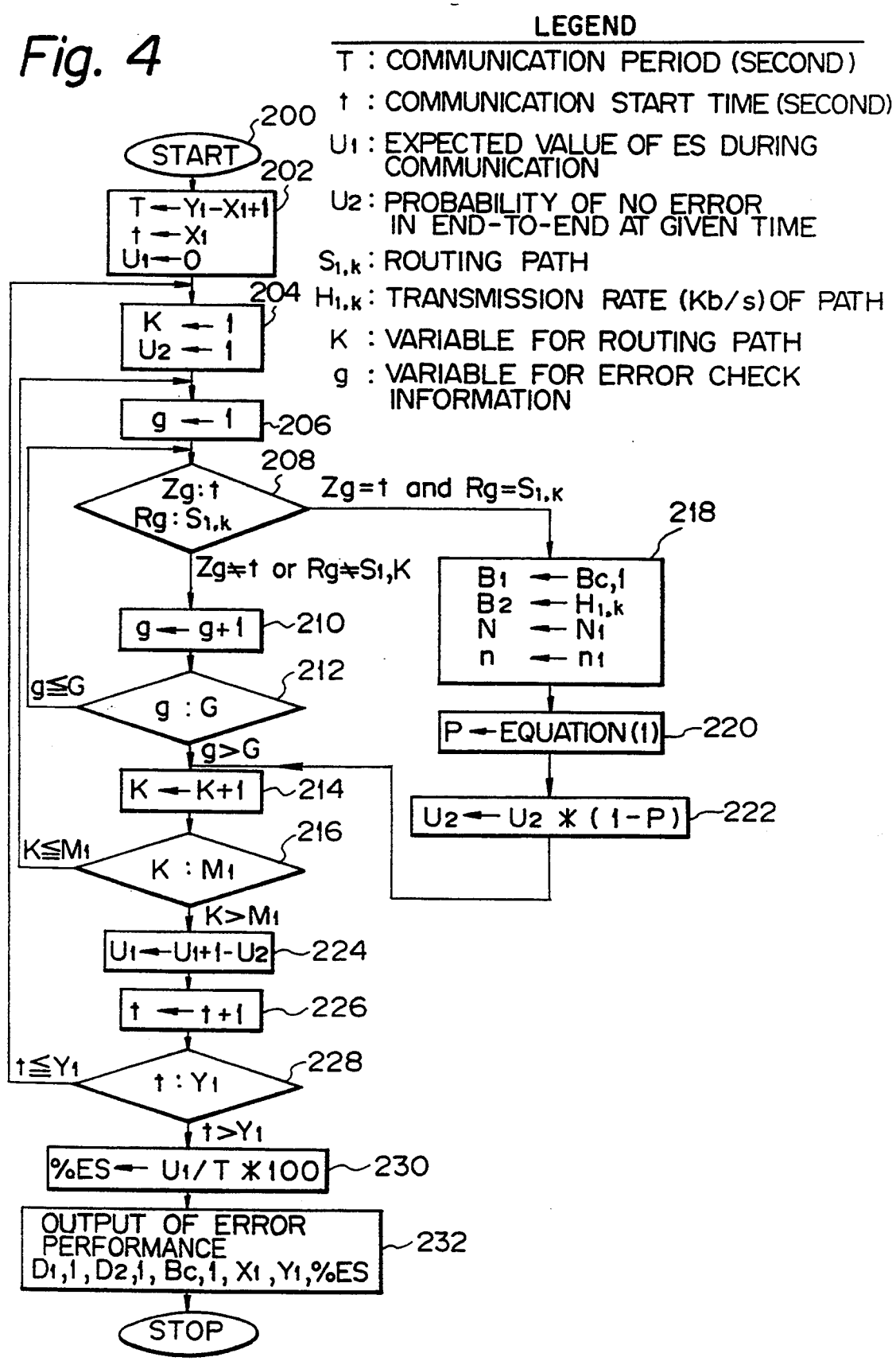
FIG. 4 is an operational flow chart for estimating %ES for each call according to call information, path information and error check information.

FIG. 4 shows a flow chart of a computer operation to provide the error monitoring information 2d for the call 1 in FIG. 5. In FIG. 4, the box 200 indicates the start of the operation. The boxes 202, 204 and 206 initiates some variables. The symbol T is the communication period (seconds) which is represented by $Y_1-X_1=1$, the symbol t is the time of communication and is initiated by $X_1$ and varies until $Y_1$. The symbol k is a variable showing a routing path $S_{I,k}$ (k=1 through $M_1$), the symbol g (g=1 through G) is a variable for error check information (FIG. 7). The symbols U1 and U2 show the expected value of ES during communication period, and the probability of no error at a certain time (second), respectively. The initial value of U1 is 0 (zero), and the initial value of U2 is 1 (one).

The variables t, k and g are incremented one by one in boxes 208, 210, 212, 214 and 216.

The box 208 compares the variable t with the errored time $Z_g$ in FIG. 7, and the variable k ($S_{i,k}$) with the path $R_g$ in FIG. 7. When both variables coincide with $Z_g$ and $R_g$, respectively, it means that an error occurred in the k'th path at time t.

When an error occurred, the probability P (which is ES(errored second) in a second) is calculated according to the equation (1) in the boxes 218 and 220, by inserting $B_{c,l}$ into B1, $H_{l,k}$ into B2, N1 into N, and n1 into n.

The box 222 updates the value U2 (probability of no error) by calculating $U2 \times (1-P)$.

After the operation in box 222 finishes, operation proceeds to box 214.

When no error is recognized in box 208, operation proceeds to box 210. The similar operation is repeated by incrementing the value g (210) and the value k (214), until the variable g reaches G (212), and the variable k reaches $M_1$ (216), as shown in FIG. 5. When g is equal to or smaller than G in box 212, operation proceeds to box 208. When k is equal to or smaller than $M_1$ in box 216, operation proceeds to box 208 through box 206 which initiates the value g to 1.

When the value k exceeds the value $M_1$ in box 216, operation proceeds to box 224, and the output of box 216 provides the value U2 which is the probability of no error in all the paths between two terminals at time T.

The similar operation is repeated until the variable g reaches G, and the variable k reaches M1 (FIG. 5). Then, the output of the box 216 provides the value U2 which is the probability of no error in all the paths between two terminals at time t.

The value 1-U2 indicates U1 or ES which is the probability of error between two terminals at time t. The value U1 is updated to U1+1−U2 in the box 224, which accumulates U1 for all the times t in the boxes 226 and 228. The box 226 increments t, and the box 228 tests if the value t reaches Y1 or not. When the value t does not reach the value $Y_1$, operation proceeds to box 204.

When the value t exceeds Y1 in the box 228, the probability U1 at the output of the box 228 shows the expectation of error second (ES) during the communication period.

Then, the box 230 provides the percent ES (%ES) by calculating $(U1/T) \times 100$. The box 232 provides the error monitoring information, having an originating terminal identification $D_{1,1}$, a terminating terminal identification $D_{2,1}$, transmission rate $B_{c,l}$, start time $X_1$, end time $Y_1$, and %ES.

As described above in detail, according to the present invention, an error performance between end terminals in exchange circuits is monitored for each call.

From the foregoing, it will now be apparent that a new and improved error performance monitoring system has been found. It should be understood of course that embodiments disclosed are merely illustrative and are not intended to limit the scope of the invention. Reference should be made to the appended claims, therefore, rather than the specification as indicating the scope of the invention.

What is claimed is:

1. A method for monitoring an error performance of each call in a digital exchange circuit having at least a plurality of subscriber terminals, the exchange system coupled with said subscriber terminals, and transmission system which includes a plurality of circuits forming transit paths, comprising the steps of:
   collecting and storing error check information of each transit path together with collected time of said information,
   collecting and storing call information of each call including call identification with terminal numbers of an originating subscriber terminal and a terminating terminal, transmission rate, start time and end time of a call, and circuits which said call is routed,
   providing a circuit accommodation database information indicating which of the plurality of circuits form a path for each call, and
   calculating error performance of each call according to said error check information, said call information, and said circuit accommodation database information.

2. A method for monitoring error performance according to claim 1, wherein said step of calculating error performance includes the step of searching a path which the call is routed by using the circuit accommodation database.

3. A method for monitoring error performance according to claim 1, wherein said step of calculating error performance includes the step of calculating error performance in each path during a call by using a transmission error check information storage.

4. A method for monitoring error performance according to claim 3, wherein the calculation of error performance in each circuit during a call is carried out by using an equation;

$$P = 1 - (1 - B1/B2)^{(n \times B2 \times 1000)/N}$$

where P is probability of errored second in a circuit,
B1 is transmission rate (kb/s) of a circuit,
B2 is transmission rate (kb/s) of a path,
N is number of error check blocks of a path in a second,
n is number of errored blocks in N times of checks.

5. A method for monitoring error performance according to claim 4, wherein %ES which is a probability of error in a second of each call is calculated by using an equation;

$$\% ES = \left( \sum_{i=1}^{T} \left( 1 - \prod_{j=1}^{M} (1 - P_{i,j}) \right) / T \right) \times 100$$

where M is total number of circuits which a call is routed,
$P_{i,j}$ is P of the circuit accommodated in the path j at time i,
T is communication time duration.

6. An error performance monitoring system for each call in a digital exchange circuit having at least a plurality of subscriber terminals, an exchange system coupled with said subscriber terminals, and transmission system which includes a plurality of circuits forming transit paths, said system comprising:

a transmission error check information storage coupled with said transmission system for collecting and storing error check information of each transit path together with collected time of said information, call information storage coupled with said exchange system for collecting and storing call information including a call identification with terminal numbers of an originating subscriber terminal and a terminating terminal, transmission rate, start time and end time of a call and circuits which said call is routed, a circuit accommodation database storing information indicating which of said circuits form each path, and end-to-end transmission error performance evaluation means for calculating error performance of each call between an originating terminal and a terminating terminal through a digital exchange system and a transit path according to said error check information, said call information, and said circuit accommodation database.

* * * * *